(12) United States Patent
Thompson

(10) Patent No.: US 7,934,218 B2
(45) Date of Patent: Apr. 26, 2011

(54) INTERPROCESS COMMUNICATION MANAGEMENT USING A SOCKET LAYER

(75) Inventor: Belinda L. Thompson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 11/393,583

(22) Filed: Mar. 30, 2006

(65) Prior Publication Data

US 2007/0233876 A1 Oct. 4, 2007

(51) Int. Cl.
*G06F 3/00* (2006.01)
*G06F 13/00* (2006.01)
(52) U.S. Cl. ..................... 719/312; 719/313
(58) Field of Classification Search .................. 719/312, 719/313, 328, 330
See application file for complete search history.

(56) References Cited

U.S. PATENT DOCUMENTS

| | | | |
|---|---|---|---|
| 5,365,606 A | 11/1994 | Brocker et al. | |
| 5,430,846 A | 7/1995 | Moore | |
| 5,652,885 A | 7/1997 | Reed et al. | |
| 6,334,155 B1 | 12/2001 | Long et al. | |
| 6,470,398 B1 * | 10/2002 | Zargham et al. | 719/318 |
| 6,600,736 B1 | 7/2003 | Ball et al. | |
| 6,854,119 B1 * | 2/2005 | Bauman et al. | 719/310 |
| 7,320,044 B1 * | 1/2008 | Zandonadi et al. | 710/261 |
| 7,373,647 B2 * | 5/2008 | Kalmuk et al. | 719/317 |

OTHER PUBLICATIONS

"A Socket-based IPC Tutorial", 1999, pp. 1-15.*
Stover, Thomas, "Demystifyig Unix Domain Sockets", Feb. 2006, pp. 1-7.*
Mock, W.E., "BSD Socket-Based Message Queue IPC System Implementation," IBM Technical Disclosure Bulletin, vol. 34, No. 9, Feb. 1992, pp. 168-173.
Christiansen, T., "socketpair—create a pair of sockets," http://www.perl.com/doc/manual/html/pod/perlfunc/socketpair,html, printed on Nov. 28, 2005.

* cited by examiner

*Primary Examiner* — Qing Wu
(74) *Attorney, Agent, or Firm* — Fred Grasso

(57) ABSTRACT

A solution for managing interprocess communication is provided. A connection request that identifies another process is received from a first process on a socket. The invention determines if the identified process has a second socket that can be used without transmitting data outside a computing device. If so, then the two sockets are linked, and an in-memory communication session can be managed to implement the interprocess communication. In this manner, two processes executing on the same computing device, each of which supports network communications using sockets, can have in-memory interprocess communication without any knowledge of where the other process is executing or any customization.

25 Claims, 3 Drawing Sheets

US 7,934,218 B2

INTERPROCESS COMMUNICATION MANAGEMENT USING A SOCKET LAYER

FIELD OF THE INVENTION

The invention relates generally to interprocess communication, and more particularly, to a solution for using a socket layer to manage interprocess communication within a computing device.

BACKGROUND OF THE INVENTION

Interprocess communication (IPC) is frequently desired in computing environments. To this extent, numerous approaches have been used to facilitate IPC. For example, two processes can read/write data to a portion of memory that is shared or a common file. However, in this approach, extensive coordination is required between the processes in order to handle data storage/file usage and data management (e.g., mutual exclusion). In another approach, a pipe (e.g., a named pipe) or message queue can be used to direct the output of one process to an input of another process. However, in this approach, data can only be communicated asynchronously and each pipe only supports communications in one direction.

The UNIX® operating system (UNIX is a registered trademark of The Open Group in the United States and other countries) provides another approach that can be used for a specific type of IPC. In particular, a single process can create a pair of connected, but unnamed sockets (i.e., a socket pair) using the socketpair( ) function. The socket pair is similar to a pipe, however it is bidirectional. The process then can create a new process (e.g., a child process using fork( )) and provide one of the connected sockets to the new process. Both the original and new processes can communicate with one another using the linked sockets. However, this approach requires both processes to be related (e.g., parent/child) and cannot be used to enable two mutually exclusive processes to communicate.

Many applications, such as legacy applications, include an ability to communicate with other processes via a network. In this case, messages from a first process generally are sent outside of the computing device to one or more network devices and routed to a computing device executing the second process. However, when both applications/processes are executing on the same computing device, such a message routing is inefficient and adds message traffic to the network.

In view of the foregoing, a need exists to overcome one or more of the deficiencies in the related art.

BRIEF SUMMARY OF THE INVENTION

The invention provides a solution for managing interprocess communication. A connection request that identifies another process is received from a first process on a socket. The invention determines if the identified process has a second socket that can be used without transmitting data outside a computing device. If so, then the two sockets are linked, and an in-memory communication session can be managed to implement the interprocess communication. In this manner, two processes executing on the same computing device, each of which supports network communications using sockets, can have in-memory interprocess communication without any knowledge of where the other process is executing or any customization.

A first aspect of the invention provides a method of managing interprocess communication, the method comprising: receiving a connection request via a first socket for a first process executing on a computing device, the connection request identifying a second process that is exclusive from the first process; determining if the second process has a second socket on the computing device; and linking the first socket with the second socket when the second process has the second socket.

A second aspect of the invention provides a system for managing interprocess communication, the system comprising: a system for receiving a connection request via a first socket for a first process executing on a computing device, the connection request identifying a second process that is exclusive from the first process; a system for determining if the second process has a second socket on the computing device; and a system for linking the first socket with the second socket when the second process has the second socket.

A third aspect of the invention provides a program product stored on a computer-readable medium, which when executed, enables a computer infrastructure to manage interprocess communication, the program product comprising computer program code for enabling the computer infrastructure to: receive a connection request via a first socket for a first process executing on a computing device, the connection request identifying a second process that is exclusive from the first process; determine if the second process has a second socket on the computing device; and link the first socket with the second socket when the second process has the second socket.

A fourth aspect of the invention provides a method of generating a system for managing interprocess communication, the method comprising: providing a computer infrastructure operable to: receive a connection request via a first socket for a first process executing on a computing device, the connection request identifying a second process that is exclusive from the first process; determine if the second process has a second socket on the computing device; and link the first socket with the second socket when the second process has the second socket.

A fifth aspect of the invention provides a business method for managing interprocess communication, the business method comprising managing a computer infrastructure that performs the method described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing interprocess communication. A connection request that identifies another process is received from a first process on a socket. The invention determines if the identified process has a second socket that can be used without transmitting data outside a computing device. If so, then the two sockets are linked, and an in-memory communication session can be managed to implement the interprocess communication. In this manner, two processes executing on the same computing device, each of which supports network communications using sockets, can have in-memory interprocess communication without any knowledge of where the other process is executing or any customization. As used herein, unless otherwise noted, the term "set" means one or more (i.e., at least one) and the phrase "any solution" means any now known or later developed solution.

Figure 1:
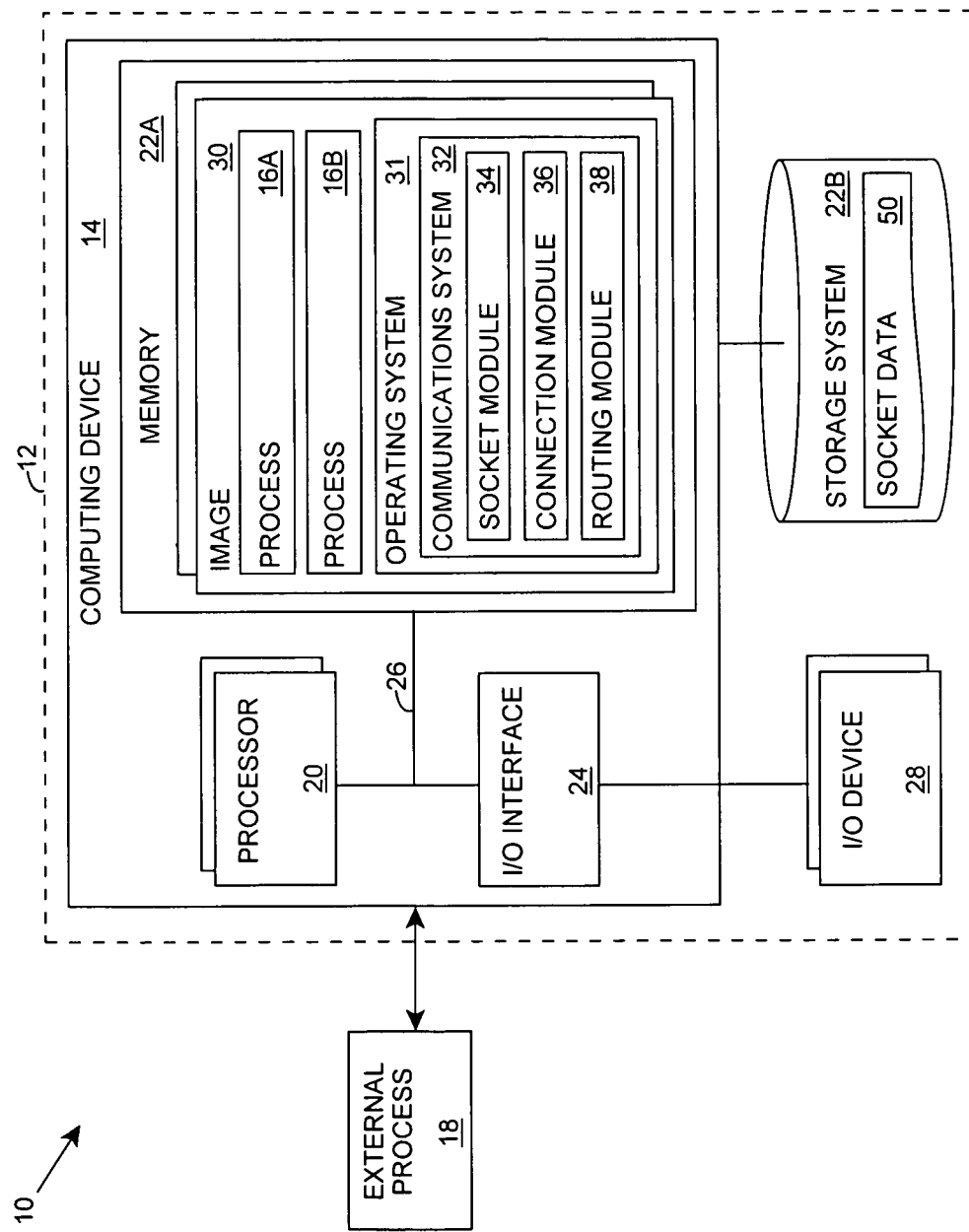
FIG. 1 shows an illustrative environment for managing interprocess communication according to an embodiment of the invention.

Turning to the drawings, FIG. 1 shows an illustrative environment 10 for managing interprocess communication (IPC) according to an embodiment of the invention. To this extent, environment 10 includes a computer infrastructure 12 that can perform the method described herein in order to manage IPC between processes 16A-B and/or external process 18. In particular, computer infrastructure 12 is shown including a computing device 14 that comprises a communications system 32, which makes computing device 14 operable to manage IPC for processes 16A-B and/or external process 18 by performing the method described herein.

Computing device 14 is shown including a set of processors 20, a memory 22A, an input/output (I/O) interface 24, and a bus 26. Further, computing device 14 is shown in communication with a set of external I/O device/resource 28 and a storage system 22B. As is known in the art, in general, processor 20 executes computer program code, such as communications system 32, which is stored in memory 22A and/or storage system 22B. While executing computer program code, processor 20 can read and/or write data, such as socket data 50, to/from memory 22A, storage system 22B, and/or I/O interface 24. Bus 26 provides a communications link between each of the components in computing device 14. I/O device(s) 28 can comprise any combination of devices that transfer information between a user and computing device 14. To this extent, I/O device(s) 28 can comprise a user I/O device to enable an individual user to interact with computing device 14 and/or a communications device to enable a system user, such as external process 18, to communicate with computing device 14 using any type of communications link.

As shown, computing device 14 can comprise a server, in which memory 22A is capable of including a plurality of images (e.g., logical partitions) 30. Each image 30 includes an operating system 31, which can be running/executing one or more processes 16A-B. Each process 16A-B can be executing as part of a user application, a system application, and/or the like. Further, each application can include a set of related processes, e.g., parent-child processes, sibling processes and/or the like. Two processes 16A-B are "exclusive" when they are implemented as part of distinct applications, e.g., processes 16A-B do not have a parent-child, sibling, or the like, relationship. Operating system 31 includes a communications system 32, such as a network device handler (NDH), that enables processes 16A-B to send/receive data to/from one or more external processes 18. Processes 16A-B can use any network protocol to communicate with external processes 18, such as token ring, ethernet, X.25, transmission control protocol (TCP), the internet protocol (IP), and/or the like. In one embodiment, operating system 31 comprises a UNIX-based operating system, e.g., Linux.

In any event, computing device 14 can comprise any general purpose computing article of manufacture capable of executing computer program code installed thereon (e.g., a personal computer, server, handheld device, etc.). However, it is understood that computing device 14 and communications system 32 are only representative of various possible equivalent computing devices that may perform the method described herein. To this extent, in other embodiments, the functionality provided by computing device 14 and communications system 32 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of communications link, such as a network, a shared memory, or the like, to perform the method described herein. Further, while performing the method described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, communications system 32 enables computer infrastructure 12 to manage IPC for processes 16A-B and/or external process 18. To this extent, communications system 32 is shown including a socket module 34, a connection module 36 and a routing module 38. Operation of each of these systems is discussed further herein. However, it is understood that some of the various systems/modules shown in FIG. 1 can be implemented independently, combined, and/or stored in memory for one or more separate computing devices that are included in computer infrastructure 12. Further, it is understood that some of the systems/modules and/or functionality may not be implemented, or additional systems/modules and/or functionality may be included as part of computer infrastructure 12.

Regardless, the invention provides a solution for managing IPC for processes 16A-B. In particular, communications system 32 can manage IPC between two exclusive processes 16A-B, between two related processes 16A-B, and/or between a process, such as process 16A, and an external process 18. While shown outside computer infrastructure 12, it is understood that external process 18 could be running/executing within computer infrastructure 12, e.g., on another computing device 14, within another image 30 on computing device 14, and/or the like.

Figure 2:
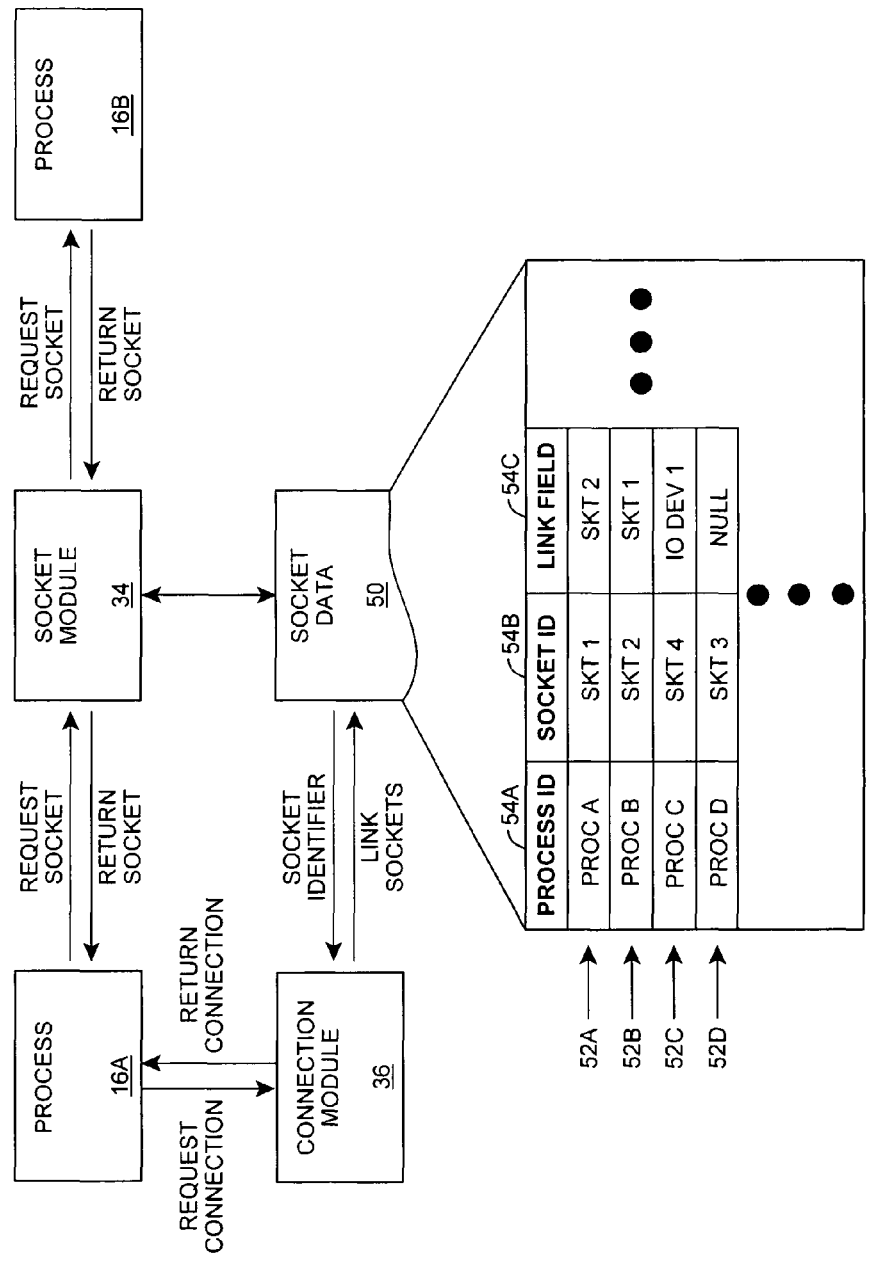
FIG. 2 shows an illustrative data flow diagram within the computer infrastructure of FIG. 1 according to an embodiment of the invention.

FIG. 2 shows an illustrative data flow diagram within computer infrastructure 12 (FIG. 1) according to an embodiment of the invention. In order to communicate with one or more other processes, each process 16A-B forwards a request for a socket to socket module 34, which includes an identification of the process, e.g., an IP address, a media access control (MAC) address, a name, and/or the like. In response, socket module 34 creates a socket for each process 16A-B (e.g., binds the socket to the process). To this extent, socket module 34 can manage socket data 50 for each socket. For example, socket data 50 can comprise a set of socket entries 52A-D, each of which includes data on a currently open socket. To this extent, each socket entry 52A-D can include: a process identifier field 54A, which includes data that uniquely identifies the process 16A-B to which the socket belongs; a socket identifier field 54B, which includes data that uniquely identifies the socket; and a link field 54C, which, as discussed further herein, can include data that identifies a linked socket, I/O device, I/O device type, and/or the like. It is understood that socket entries 52A-D and fields 54A-C are only illustrative. To this extent, each socket entry 52A-D can include additional fields for storing other data about each socket and/or socket data 50 can be stored using an alternative format. Further, socket data 50 can be stored and retrieved using any solution, such as one or more files in a file system, one or more records in a database, and/or the like.

When a process, such as process 16A, desires to communicate with another process, e.g., process 16B and/or external process 18 (FIG. 1), process 16A can send a connection request using its corresponding socket to connection module 36. The connection request can comprise any type of message. For example, the connection request can comprise a first data message that is transmitted by process 16A for process 16B. Further, the connection request can identify the other process with which communication is desired using any solution, e.g., via an IP address, a MAC address, a name, and/or the like. After receiving the connection request, connection module 36 can determine if the identified process has a socket on computing device 14 (FIG. 1). To this extent, connection module 36 can look in socket data 50 to determine if data for an open socket of the process is included. If so, then connection module 36 can link the two sockets.

For example, process 16A could request a connection with process 16B. Connection module 36 can first determine if process 16B is executing on computing device 14 (FIG. 1). For example, connection module 36 can query another component in operating system 31 (FIG. 1) to determine if process 16B is executing within image 30 (FIG. 1). Alternatively, connection module 36 can assume that process 16B may be executing on computing device 14. When process 16B is or is assumed to be executing on computing device 14, connection module 36 can determine if process 16B includes a socket entry in socket data 50.

When process 16B includes a socket entry, such as socket entry 52B, connection module 36 can forward the connection request to process 16B using the socket identified in socket entry 52B. If process 16B accepts the connection, connection module 36 can link the socket for process 16A with the socket for process 16B using the link fields 54C for the corresponding socket entries 52A-B. In particular, the link field 54C for the socket for process 16A can identify the socket for process 16B and vice versa. Connection module 36 also can provide the connection for use by process 16A. However, when process 16B does not accept the connection and/or does not have a local socket, then connection module 36 can provide process 16A with a message that the connection failed. When process 16A requests a connection with an external process 18 (FIG. 1), connection module 36 can forward the connection request over a communications network using any solution. Subsequently, connection module 36 can receive a result of the connection request and forward the result for use by process 16A.

Figure 3:
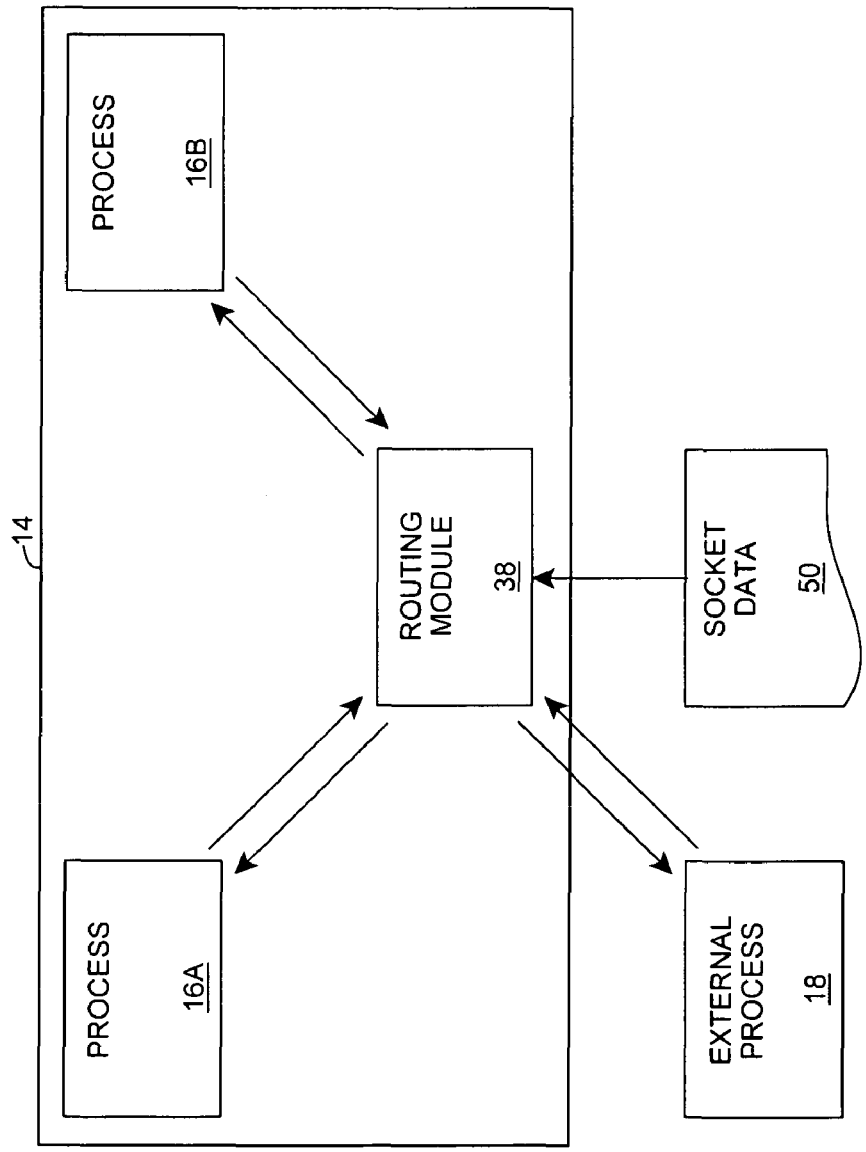
FIG. 3 shows an illustrative data flow diagram for managing communication sessions using the routing module of FIG. 1 according to an embodiment of the invention.

FIG. 3 shows an illustrative data flow diagram for managing communication sessions using routing module 38 according to an embodiment of the invention. After a connection has been established between process 16A and another process (e.g., process 16B or external process 18), routing module 38 can manage the communication session between process 16A and the other process 16B, 18 using a set of socket operations. For example, routing module 38 can receive data (e.g., one or more messages) from process 16A to be communicated to the other process 16B, 18, and can forward the data for processing by the other process 16B, 18. Subsequently, routing module 38 can receive data, such as a return code, from the other process 16B, 18, and forward the data for processing by process 16A. Similarly, the other process 16B, 18 can send data to process 16A, which results in a return code being sent to the other process 16B, 18.

When the communication session is between processes 16A-B, the communication session comprises an "in-memory communication session" in which the data being transmitted between the processes 16A-B is never communicated outside of computing device 14. Rather, the data is received by routing module 38, which uses socket data 50 to identify the linked socket for the other process 16A-B and forwards the data using the linked socket. However, from the perspective of processes 16A-B, unlike other approaches, both processes 16A-B are aware that the other end of the connection exists, can use the normal socket functions, receive return codes indicating the success/failure of the operation (e.g., confirmation data actually received by other process), etc. To this extent, processes 16A-B do not need to be modified and/or know of the other process 16A-B in order to communicate using in-memory interprocess communication. Further, one process 16A-B could be moved to another computing device 14 or image 30 (FIG. 1) and the two processes 16A-B still could communicate in the same manner.

Additionally, when one end of the connection, e.g., process 16B, terminates, the end-to-end connection is lost. In this case, the remaining socket can remain open, waiting for a link to be established. Further, connection module 36 (FIG. 2) can update socket data 50 of the remaining socket to reflect the lost connection (e.g., set link field 54C of FIG. 2 to NULL or the like). In this manner, process 16A can readily establish a connection with another process and/or reestablish a connection with process 16B.

While shown and described herein as a method and system for managing IPC, it is understood that the invention further provides various alternative embodiments. For example, in one embodiment, the invention provides a program product stored on a computer-readable medium, which when executed, enables a computer infrastructure to manage IPC. To this extent, the computer-readable medium includes program code, such as communications system 32 (FIG. 1), which implements the method described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), on paper (e.g., capable of being scanned in as electronic data), and/or the like.

In another embodiment, the invention provides a method of generating a system for managing IPC. In this case, a computer infrastructure, such as computer infrastructure 12 (FIG. 1), can be obtained (e.g., created, maintained, having made available to, etc.) and one or more systems for performing the method described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the method steps of the invention.

In still another embodiment, the invention provides a business method that performs the method described herein on a subscription, advertising, and/or fee basis. That is, a service provider, such as a solutions integrator, could offer to manage IPC as described herein. In this case, the service provider can manage (e.g., create, maintain, support, etc.) a computer infrastructure, such as computer infrastructure 12 (FIG. 1), that performs the method described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing interprocess communication, the method comprising:
   receiving a connection request via a first socket for a first process executing on a computing device, the connection request identifying a second process that is exclusive from the first process;
   after receiving the connection request, determining if the second process already has a second socket on the computing device that can be used without transmitting data outside of the computing device; and
   after receiving the connection request,
      when the second process has an existing second socket on the computing device linking the first socket with the second socket, and
      when the second process does not have an existing second socket on the computing device then returning a failure to the connection request.

2. The method of claim 1, further comprising:
   managing an in-memory communication session between the first process and the second process using a set of socket operations,
      the socket operations including socket entries, the socket entries including
         a processor identifier field,
         a socket identifier field, and
         a link field.

3. The method of claim 2, wherein the managing includes:
   receiving data from one of the first process or the second process; and
   forwarding the data for processing by the other of the first process or the second process
      and when the second process terminates, the first socket remains open.

4. The method of claim 3, further comprising:
   receiving a return code based on the forwarding; and
   forwarding the return code for processing by the one of the first process or the second process.

5. The method of claim 1, further comprising:
   after linking the first socket with the second socket, forwarding the connection request over a communications network when the second process does not have the second socket on the computing device.

6. The method of claim 1, further comprising:
   prior to receiving the connection request, creating the first socket for the first process; and
   prior to receiving the connection request, creating the second socket for the second process,
   wherein linking the first socket with the second socket includes updating a socket data table, and
   wherein determining if the second process has a second socket on the computing device includes considering a socket data table.

7. The method of claim 1, further comprising:
   managing socket data for the first and second sockets, the socket data including a link field for each of the first and second sockets.

8. The method of claim 1 wherein the first socket and the second socket support network communications from the computing device executing the first process and the second process.

9. The method of claim 1 wherein the second socket is bound to the second process and the first socket is bound to the first process before linking the first socket with the second socket.

10. An interprocess communication system comprising:
   computer memory having a socket module configured to receive a connection request via a first socket, for a first process executing on a computing device, the connection request identifying a second process that is exclusive from the first process;
   computer memory having a connection module configured to determine if the second process has an existing second socket on the computing device that can be used without transmitting data outside of the computing device, the existing second socket supporting network socket communications; and
   computer memory having a routing module configured, after determining that the second process has an existing second socket on the computing device, to link the first socket with the existing second socket when the second process has the second socket on the computing device, and to return a failure to connect when the second process does not have an existing second socket on the computing device.

11. The system of claim 10 wherein the routing module is further configured to manage an in-memory communication session between the first process and the second process using a set of socket operations.

12. The system of claim 10 wherein the connection module is further configured to forward the connection request over a communications network when the second process does not have the second socket on the computing device.

13. The system of claim 10 wherein the socket module is further configured to create the first socket for the first process; and
wherein the socket module is further configured to create the second socket for the second process.

14. The system of claim 10 wherein the socket module is further configured to manage socket data for the first and second sockets, the socket data including a link field for each of the first and second sockets.

15. The system of claim 10, wherein the first process and the second process are executing in one of a plurality of images on the computing device.

16. The system of claim 10, wherein one or more of the modules comprises a network device handler (NDH) for a UNIX-based operating system.

17. A computer-readable non-transitory article of manufacture containing instructions, which when executed, enables a computer infrastructure to manage interprocess communication, the article of manufacture comprising computer program code for enabling the computer infrastructure to:
receive a connection request via a first socket, the first socket bound to a first process executing on a computing device, the connection request identifying a second process that is exclusive from the first process;
determine if the second process is bound to a second socket on the computing device that can be used without transmitting data outside of the computing device;
link the first socket with the second socket when the second process is previously bound to a second socket on the computing device; and
return a failure when the second process does not have an existing second socket on the computing device.

18. The article of manufacture of claim 17, further comprising:
computer program code for enabling the computer infrastructure to manage an in-memory communication session between the first process and the second process using a set of socket operations.

19. The article of manufacture of claim 17, further comprising:
computer program code for enabling the computer infrastructure to forward the connection request over a communications network when the second process does not have the second socket on the computing device.

20. The article of manufacture of claim 17, further comprising:
computer program code for enabling the computer infrastructure to:
create the first socket for the first process, prior to receiving the connection request via the first socket; and
create the second socket for the second process, prior to determining if the second process has a second socket on the computing device.

21. The article of manufacture of claim 17, further comprising:
computer program code for enabling the computer infrastructure to manage socket data for the first and second sockets, the socket data including a link field for each of the first and second sockets, wherein the link field identifies sockets associated with the first socket and the second socket.

22. A system for managing interprocess communication comprising: a computer infrastructure having memory storing instructions therein, which when executed, the instructions configuring a computing device to be operable to:
receive a connection request via a first socket for a first process executing on a computing device, the connection request identifying a second process that is exclusive from the first process;
determine if the second process already has a second socket on the computing device that can be used without transmitting data outside of the computing device;
link the first socket with the second socket when the second process has a second socket on the computing device; and
return a failure when the second process does not have an existing second socket on the computing device.

23. A method of interprocess communication comprising:
receiving at a communication system a connection request from a first process on a socket, the connection request identifying a second process;
determining by the communication system if the second process is bound to a second socket that can be used without transmitting data outside a computing device;
after the second process is determined to be bound to a second socket that can be used without transmitting data outside a computing device, linking the first socket and the second socket; and
returning a failure when the second process does not have an existing second socket on a computing device.

24. The process of claim 23 wherein the first process and the second process are executing on the same computing device.

25. The process of claim 23 further comprising:
moving the second process or the first process to a computing device or image different from when the first process and the second process were linked and continuing to use the linked first socket and second socket for interprocess communication.

* * * * *